US007769378B2

(12) United States Patent
Dorenbosch et al.

(10) Patent No.: US 7,769,378 B2
(45) Date of Patent: Aug. 3, 2010

(54) SYSTEM AND METHOD TO IMPROVE WLAN HANDOVER BEHAVIOR AT ENTRY/EXIT POINTS

(75) Inventors: Jheroen P. Dorenbosch, Paradise, TX (US); Jack Anthony Gipson, Fort Worth, TX (US); Lowell C. Hufferd, III, Keller, TX (US); Alex P. Hirsbrunner, Bloomingdale, IL (US); Anatoly S. Belkin, Glenview, IL (US); Anand Bernard Alen, Chicago, IL (US); Brian D. Storm, Round Lake Beach, IL (US)

(73) Assignee: Motorola, Inc., Schaumburg, IL (US)

( * ) Notice: Subject to any disclaimer, the term of this patent is extended or adjusted under 35 U.S.C. 154(b) by 1212 days.

(21) Appl. No.: 10/649,756

(22) Filed: Aug. 26, 2003

(65) Prior Publication Data

US 2005/0048972 A1 Mar. 3, 2005

(51) Int. Cl.
*H04W 4/00* (2009.01)
*H04W 36/00* (2009.01)
(52) U.S. Cl. .................. 455/435.1; 455/436; 455/442; 455/456.1; 455/404.2; 455/403; 370/331; 370/332; 370/310
(58) Field of Classification Search ......... 455/436–453, 455/435.2, 435.1, 403, 422.1; 370/331, 337, 370/338, 328, 344
See application file for complete search history.

(56) References Cited

U.S. PATENT DOCUMENTS

| | | | |
|---|---|---|---|
| 5,239,667 A | | 8/1993 | Kanai |
| 5,796,727 A | * | 8/1998 | Harrison et al. ............. 370/338 |
| 5,873,033 A | * | 2/1999 | Hjern et al. ................. 455/417 |
| 6,381,463 B1 | | 4/2002 | Tu et al. |
| 6,385,460 B1 | | 5/2002 | Wan |
| 6,424,834 B1 | | 7/2002 | Chang et al. |

(Continued)

FOREIGN PATENT DOCUMENTS

EP 1241909 A 9/2002

(Continued)

OTHER PUBLICATIONS

Fuhrmann et al, "BlueWand: A Versatile Remote Control and Pointing Device", University of Karlsruhe, Germany, 2002. http://www.computer.org/csidc/2002ProjectReport/Karlsruhe-final.pdf.

(Continued)

*Primary Examiner*—Huy Phan

(57) ABSTRACT

A system, wireless device (306) and method determine that a wireless device (306) is detecting a triggering event. The triggering event includes detecting a WLAN border cell (210), detecting a first signal from an egress portal (302), or detecting a degradation in signal quality. The wireless device (306) then detects at least one signal from an egress portal (302), determines that the wireless device (306) is moving from the coverage area of a first communications system to the coverage area of a second communications system according to the order of signals received from the egress portal (302), initiates a registration sequence with the second wireless communication system in response to determining that the wireless device (306) is moving from the coverage area of the first communications system to the coverage area of the second communications system, and conducts present and subsequent calls via the second wireless communication system.

31 Claims, 7 Drawing Sheets

U.S. PATENT DOCUMENTS

| | | |
|---|---|---|
| 6,473,038 B2 | 10/2002 | Patwari et al. |
| 6,493,550 B1 | 12/2002 | Raith |
| 6,496,695 B1 | 12/2002 | Kouji et al. |
| 6,509,830 B1 | 1/2003 | Elliott |
| 6,766,160 B1* | 7/2004 | Lemilainen et al. .......... 455/411 |
| 2002/0085540 A1* | 7/2002 | Hyvarinen et al. .......... 370/352 |
| 2002/0147008 A1* | 10/2002 | Kallio ........................ 455/426 |
| 2002/0160785 A1* | 10/2002 | Ovesjo et al. ............... 455/453 |
| 2003/0119481 A1* | 6/2003 | Haverinen et al. .......... 455/411 |
| 2003/0134636 A1* | 7/2003 | Sundar et al. ............... 455/432 |
| 2003/0134638 A1 | 7/2003 | Sundar et al. |
| 2003/0134650 A1* | 7/2003 | Sundar et al. ............... 455/465 |
| 2003/0174667 A1* | 9/2003 | Krishnamurthi et al. .... 370/328 |
| 2004/0114553 A1* | 6/2004 | Jiang et al. .................. 370/328 |
| 2004/0137902 A1* | 7/2004 | Chaskar et al. ............. 455/436 |
| 2004/0151139 A1* | 8/2004 | Li et al. ...................... 370/331 |
| 2004/0170122 A1* | 9/2004 | Guo et al. ................... 370/210 |
| 2004/0176024 A1* | 9/2004 | Hsu et al. ................... 455/3.04 |
| 2004/0192211 A1* | 9/2004 | Gallagher et al. ........ 455/67.11 |
| 2005/0079864 A1* | 4/2005 | Johnson et al. ........... 455/422.1 |

FOREIGN PATENT DOCUMENTS

| | | | |
|---|---|---|---|
| WO | WO 00/67514 | * | 4/1999 |
| WO | 200067514 A | | 11/2000 |
| WO | 0207472 A | | 1/2002 |

OTHER PUBLICATIONS

European Patent Office, "Communication", Supplementary European Search Report, Jun. 18, 2009, pp. 1-4; EPC Application Number 04780603.9-2412; Munich, Germany.

* cited by examiner

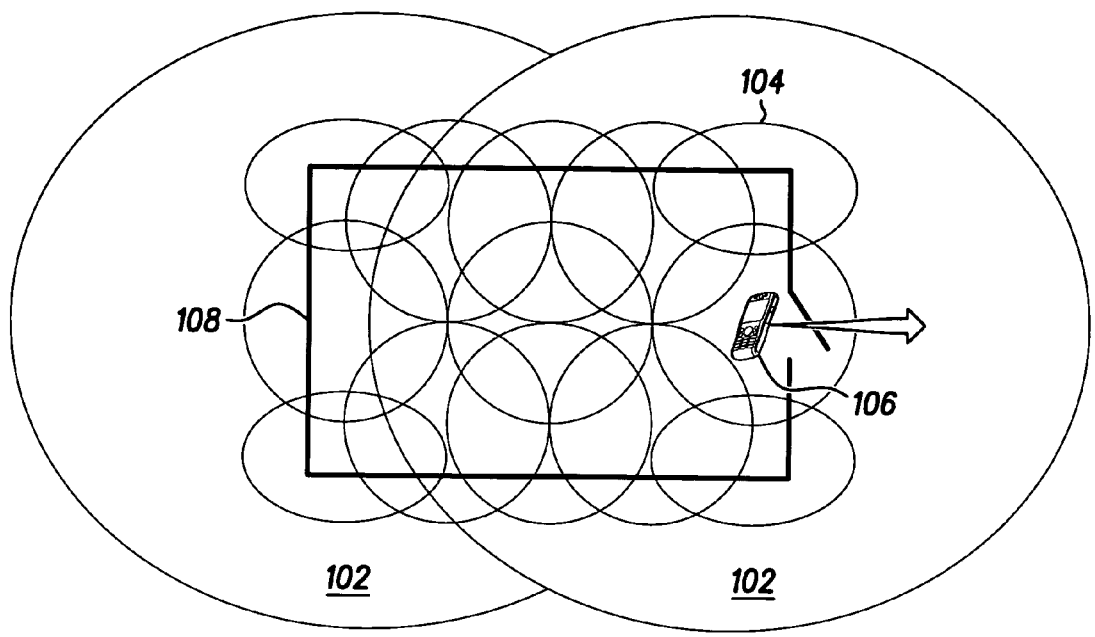
- PRIOR ART - FIG. 1
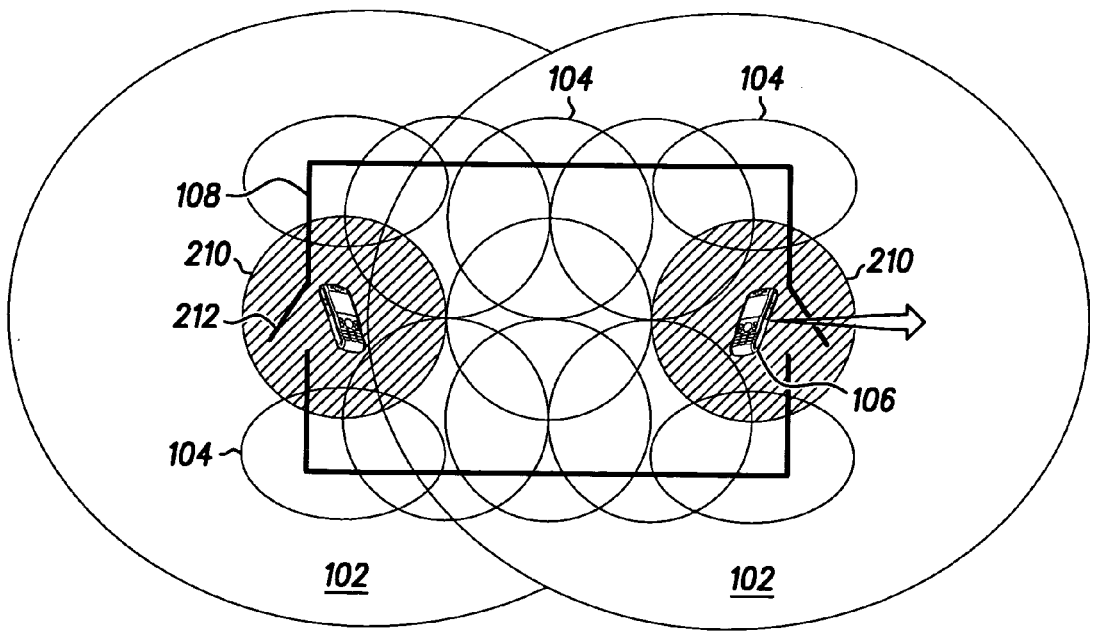
- PRIOR ART - FIG. 2

US 7,769,378 B2

SYSTEM AND METHOD TO IMPROVE WLAN HANDOVER BEHAVIOR AT ENTRY/EXIT POINTS

CROSS-REFERENCE TO RELATED APPLICATION

The present patent application is related to co-pending and commonly owned U.S. patent application Ser. No. 10/649,999, entitled "SYSTEM AND METHOD TO IMPROVE WLAN HANDOVER BEHAVIOR AND PHONE BATTERY LIFE WHEN STATIONARY IN BORDER CELLS", filed on even date with the present patent application, the entire teachings of which being hereby incorporated by reference.

FIELD OF THE INVENTION

The present invention generally relates to the field of wireless communications, and more particularly relates to a system and method to improve handover behavior between WLANs and WANs at exit points.

BACKGROUND OF THE INVENTION

Many cellular communication systems consist of a combination of different types of systems and protocols. Likewise, many of the devices used on these networks, such as cellular telephones and handheld personal data assistants, are designed to be multi-mode devices, i.e. will operate on multiple networks. Ideally, there should be no degradation or otherwise negative indication that a device is on one network or another to an end user. However, certain factors do affect performance on different networks. Battery life may be degraded on one system in comparison to another as the hardware required to operate in that particular mode may consume more energy than in another mode. Also, cost may be significantly different from one system to another and the subscriber may pay a premium to be able to use a particular network.

Many locations, such as workplaces and universities, are beginning to deploy wireless local area networks (WLANs) within a particular site or building. For these systems, devices having multi-mode operation will operate on the WLAN while within the building or site and switch over to a macro or wide area network (WAN), such as a GSM (Global System for Mobile communications), CDMA (Code Division Multiple Access), WCDMA (Wideband Code Division Multiple Access), iDEN (integrated Digital Enhanced Network) or TDMA (Time Division Multi-Access) cellular system, when the user leaves the coverage area of the WLAN. While on the WLAN system, calls are typically made using Voice-over-IP and provides a great cost savings for both the user and the cellular system.

These multi-mode devices, which are capable of operating on WLAN and WAN systems, can consume a significant amount of battery power looking for service on the WAN while camped on the WLAN. Some of this is purely wasted energy when WLAN coverage is good, and given that WLAN is the preferred connection, WAN background scans are unnecessary. However, in the event that the device knows nothing about the WAN service, it must go on the assumption that it could take minutes to find an acceptable service and therefore, should begin searching immediately. To complicate matters further, quite often more than one service provider is available on the WAN side requiring the device to search over all potential frequencies and supported Radio Access Technologies (RAT's) and not only find the channel that the preferred RAT is on but also the preferred service provider. Even if a service is found, that operator may not support the desired feature set for an application of interest requiring the device to move on and continue looking, or settle for what can be provided. This not only wastes time, but also uses extra battery life.

In order for this multi-mode system to be effective, it is desirable to have a seamless integration between systems. It is critical to be able to transfer a call in progress on one system over to a different system without a noticeable consequence to the end user, such as a lost call, an unnecessary charge, significant reduction in battery life, etc. In most instances, the burden to decide when to hand over to the other system is placed upon the actual subscriber device.

Several techniques exist for making this decision. The first, most obvious method is a "brute force" method as illustrated in FIG. 1. A typical cellular communications system consisting of overlapping WAN cells 102, with a concentration of overlapping WLAN cells 104 within a building 108 is shown. Currently the handover for calls between WLAN coverage and WAN coverage is based on relative signal strengths. However, due to the non-uniform nature of coverage caused by building structure, obstructions etc., making an accurate reliable decision to initiate the handover of the call from one system to another is difficult and error-prone. Scanning both systems costs battery life on the Mobile Device. Furthermore, the presence of any WLAN coverage holes inside the building complicates this decision making process and may result in short WAN calls when the user walks through a WLAN coverage hole, say in a stairwell for example. While within the area of WLAN coverage, the mobile subscriber device 106 is continually running the hardware and software stack for one system, and performing background checks for the other system. This insures that whenever the user leaves coverage of the WLAN system, the call is handed over to the WAN system with no noticeable interruption to the user. The problem with this method is that there is significant detrimental effect on battery life because the device must operate both sets of hardware simultaneously. Moreover, there is actually an inherent degradation in battery life of these devices in comparison to single-mode devices due to the additional power required by the WLAN chipsets. While there may be a cost savings for calls made on the WLAN system, this advantage is offset by the loss in battery life.

A prior art system that uses a more intelligent handover method is shown in FIG. 2. In this example, border cells 210 are placed near the entry and exit doors 212 of the building 108. A border cell 210 generally is served by a WLAN access point (AP) in the vicinity of entry and exit points 212. The cell has been designated as a border cell 210 and a border cell AP transmits information to the subscriber unit (SU) 106 that identifies the cell as a border cell 210. The AP would typically transmit such information in the 802.11 beacon frames and in the probe responses. Normally, before a user is leaving the WLAN coverage area 104, the subscriber unit first detects a border cell 210. The SU 106 starts the cellular stack and begins to register with the cellular network 102 upon detecting the border cell 210 information so that the call is handed over in an adequate timeframe. By the time the SU 106 is out of range of the WLAN coverage area 104, the call should be transferred to the WAN 102.

When a user is leaving the WLAN coverage 104, the decision to hand over from the WLAN 104 to the macro network 102 needs to be made as early as possible to avoid dropping calls due to the rapid falloff of the indoor WLAN coverage at the outside of the building 108. Additionally, the handover decision must not be made prematurely to avoid the service cost associated with handing over a subscriber to the macro network 102 when the SU 106 does not actually leave the WLAN coverage area 104. Similarly, users that are in a call while exiting the building or taking breaks near the entryways (e.g. smoking near exits in WLAN coverage areas 104), are unfortunately mistakenly handed over to the WAN 102.

SUMMARY OF THE INVENTION

Briefly, in accordance with preferred embodiments of the present invention, disclosed are a system, method, mobile subscriber device, and computer readable medium for improving WLAN handover behavior at entry/exit points. In accordance with a preferred embodiment of the present invention, a system, computer readable medium, mobile subscriber device and method detect two consecutive signals from at least one egress portal, determine that the wireless device is moving from the coverage area of a first communications system to the coverage area of a second communications system according to the order of signals received from the egress portal, initiate a registration sequence with the second wireless communication system in response to determining that the wireless device is moving from the coverage area of the first communications system to the coverage area of the second communications system, and conduct present and subsequent calls via the second wireless communication system.

The detection of the first signal from an egress portal may be in response to detecting a triggering event. The triggering event may include the detection of a WLAN border cell or the detection of a degradation in signal quality or the start of a call via the WLAN.

Additionally, according to an embodiment of the present invention, the step of detecting a wireless local area network border cell includes receiving status information from a WLAN access point and determining that a border cell indication of the status information is set. The status information comprises a border cell indication and a wide area network (WAN) information indicator.

Furthermore, the method may be enhanced by receiving information concerning the available WAN coverage from a WLAN border cell access point by determining that the WAN information indicator is set, querying the WLAN access point for available WAN information or decoding the available WAN information from a beacon frame transmitted by the access point and using the available WAN information to conduct communications through a wide area network. The available WAN information may include information on more than one WAN system and in general will cover the multiple WAN systems that are locally available. It will list one or more service providers, one or more Radio Access Technologies (RAT's) such as GSM, UMTS, CDMA, WCDMA, and GPRS, one or more channel frequencies, together with channel information like coding scheme, timing information, etc.

The egress portal may comprise at least one of a Bluetooth access point, an infrared transmitter, an electronic security detection device as used in typical electronic security or anti-theft systems, and a second consecutive wireless local area network (WLAN) border cell.

A preferred embodiment of the invention may handover calls from a wireless local area network (WLAN) to a wide area network (WAN), or vice versa. The WLAN may use protocols such as IEEE Standard 802.11 or Bluetooth. The WAN may use protocols such as those used in cellular systems such as code division multiple access (CDMA), wideband code division multiple access (WCDMA), time division multiple access (TDMA), global system for mobile communications (GSM), IEEE 802.20 and integrated digital enhanced network (iDEN).

An alternative embodiment uses inner and outer border cells, which are explained below. In this embodiment the SU 106 initiates a registration sequence with a second wireless communication system in response to detecting a first wireless local area network border cell that is a inner border cell, detects a second wireless local area network border cell that is an outer border cell within a predetermined amount of time, determines that the wireless device is moving from a coverage area of the first communications system to a coverage area of the second communications system in response to detecting the wireless local area network outer border cell and conducts present and subsequent calls via the second wireless communication system.

The preferred embodiments of the present invention are advantageous because they allow the wireless device to make a more intelligent decision as to whether or not to perform checks for an alternative system, whether or not to initiate a registration, and whether or not to handover a call to another network based on the actual movement of the wireless device. This prevents unnecessary loads on a WAN system, thereby saving cost, and increases the battery life of the wireless device. The benefits are especially noticed by users who spend prolonged periods of time in border cell areas, typically causing the wireless devices to run both a WLAN stack and a cellular (WAN) stack simultaneously.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is a block diagram illustrating a typical prior art wireless communications system incorporating overlapping WAN cells and WLAN cells.

FIG. 2 is a block diagram illustrating a typical prior art wireless communications system incorporating overlapping WAN cells, WLAN cells, and border WLAN cells at building entry points.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by using additional triggers to determine when to handover a call from one wireless communications system to another in a dual-mode mobile device. Considering that the cost of placing a call on a WAN system is greater than that of a WLAN system, and that battery usage is significantly improved when a wireless device 306 is operating the software and hardware for only one system at a time, it is most desirable for the wireless device 306 to be using only the WLAN system whenever possible.

Figure 3:
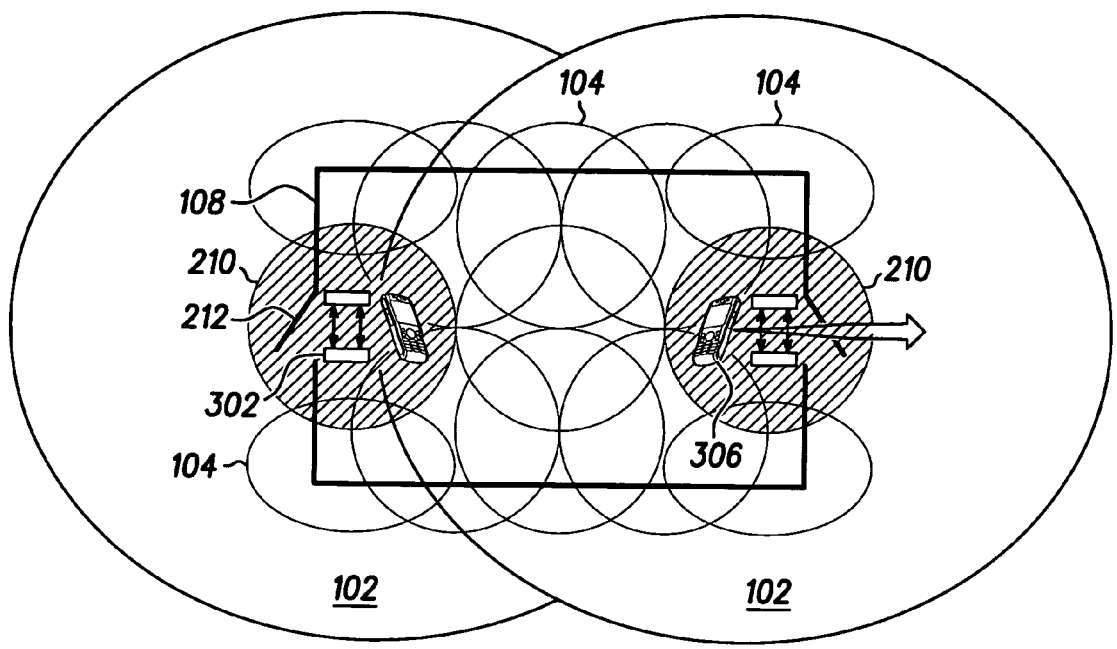
FIG. 3 is a block diagram illustrating a wireless communications system incorporating over-lapping WAN cells, WLAN cells, border WLAN cells at building entry points, and egress portals at the doorways according to a preferred embodiment of the present invention.
Figure 4:
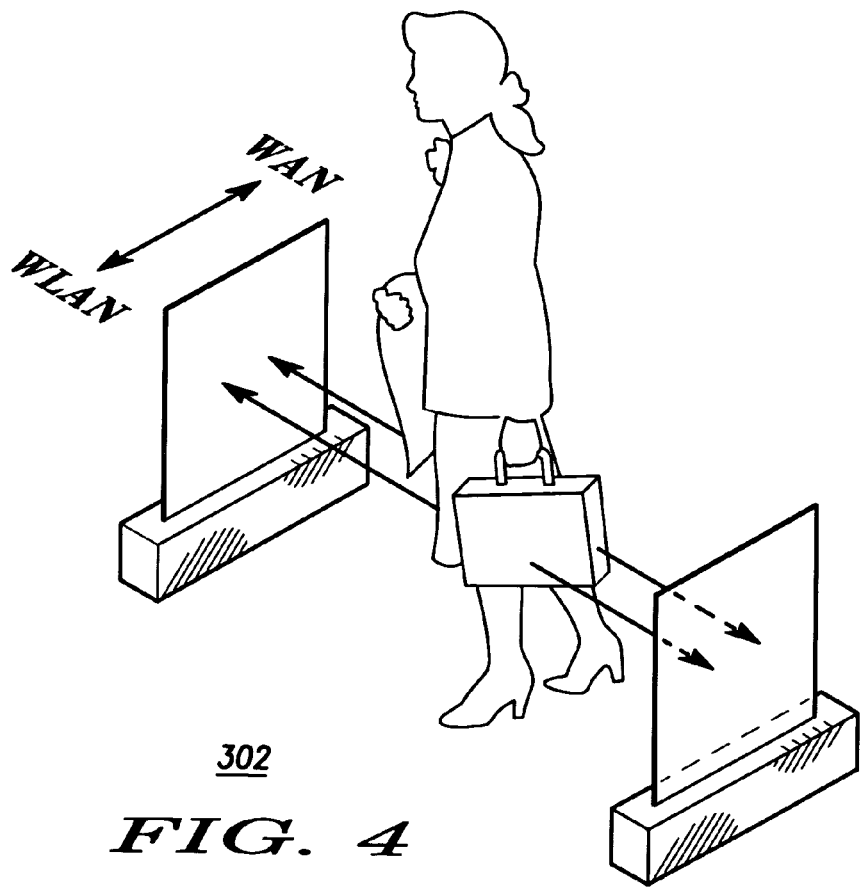
FIG. 4 is a diagram illustrating an electronic surveillance device located at an exit point, according to a preferred embodiment of the present invention.

Referring now to FIG. 3, a preferred embodiment of the present invention consists of over-lapping WAN cells 102, with a concentration of overlapping WLAN cells 104 within a building 108 as shown. The WLAN cells 104 may comprise any of a number of different wireless protocols such as IEEE Standard 802.11 or Bluetooth. An egress portal 302 is located at the building exits 212. The egress portal 302 may comprise at least one of a number of radio frequency (RF) or electromagnetic devices such as a Bluetooth access point (AP) or an Electronic Article Surveillance point. When the mobile device 306 passes through this portal, it detects a signal that instructs the wireless device 306 to initiate registration with the WAN (if not registered yet) and initiate handover of any ongoing calls between WAN/WLAN systems. To ascertain the direction in which the mobile device 306 is moving, this exemplary embodiment proposes two RF or EM lines as shown in FIG. 4. Which line is interrupted first, indicates the direction of the wireless device. However, the SU 306 may also determine direction to be WLAN to WAN if it has been operating on the WLAN for a substantial time and vice versa. No second signal is required in this case. The preferred embodiment may also contain a WLAN cell that has been designated as a border cell 210 in order to provide a transition region between the WLAN and the WAN systems.

Figure 5:
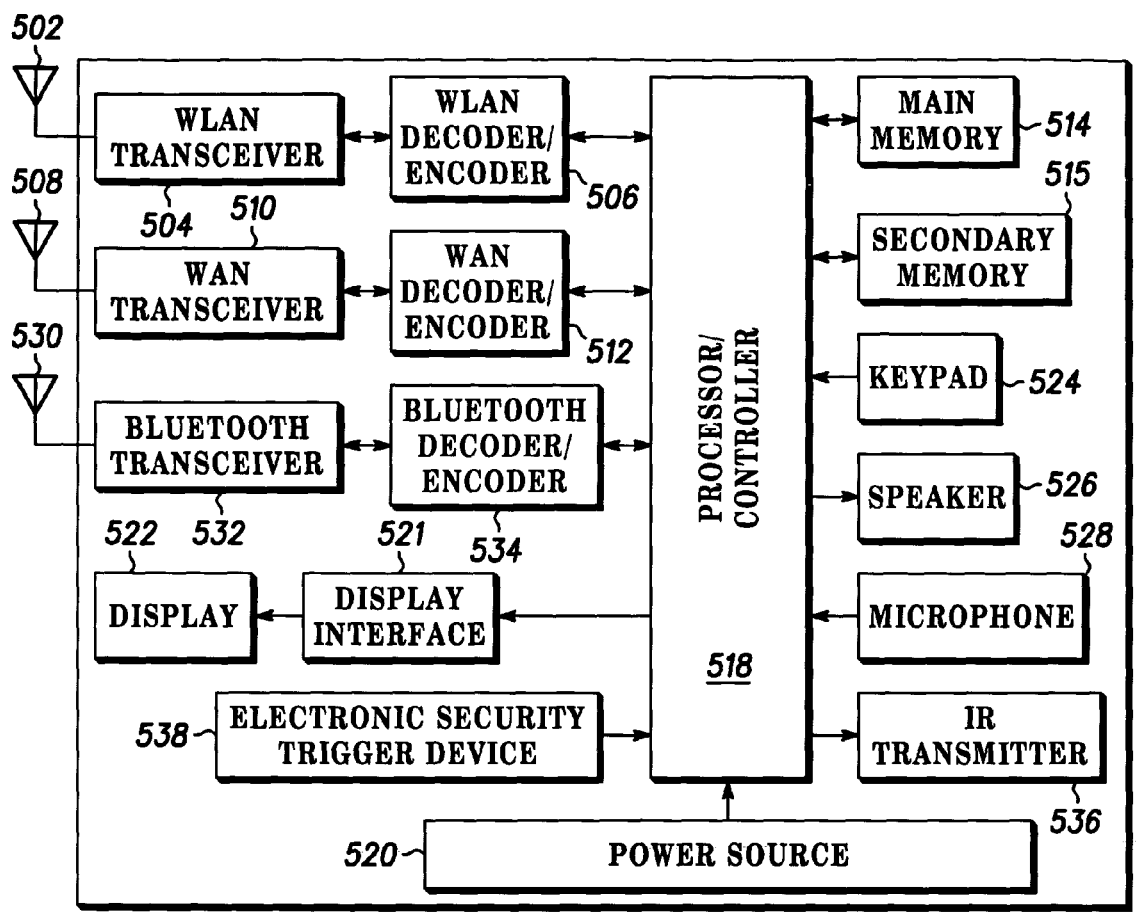
FIG. 5 is a block diagram illustrating a mobile communication device of the system of FIG. 3 according to a preferred embodiment of the present invention.

A block diagram of an exemplary mobile subscriber device (SU) 306 is shown in FIG. 5. The wireless device 306 contains two transceivers—one for the WLAN system and one for the WAN system, each transceiver containing an antenna 502, 508, an RF front end 504, 510, and a decoder/encoder 506, 512 designed to transmit, receive, encode and decode wireless signals for the frequencies and characteristics of its corresponding system. Additionally, according to a preferred embodiment of the present invention, the wireless device 306 may also have an additional transceiver containing another antenna 530, RF front end 532, and decoder/encoder 534 for operating on Bluetooth systems. Wherever possible, the antennas 502, 508, 530, front ends 504, 510, 532 and decoders/encoders 506, 512, 534 may be implemented using common, shared hardware and software.

Figure 6:
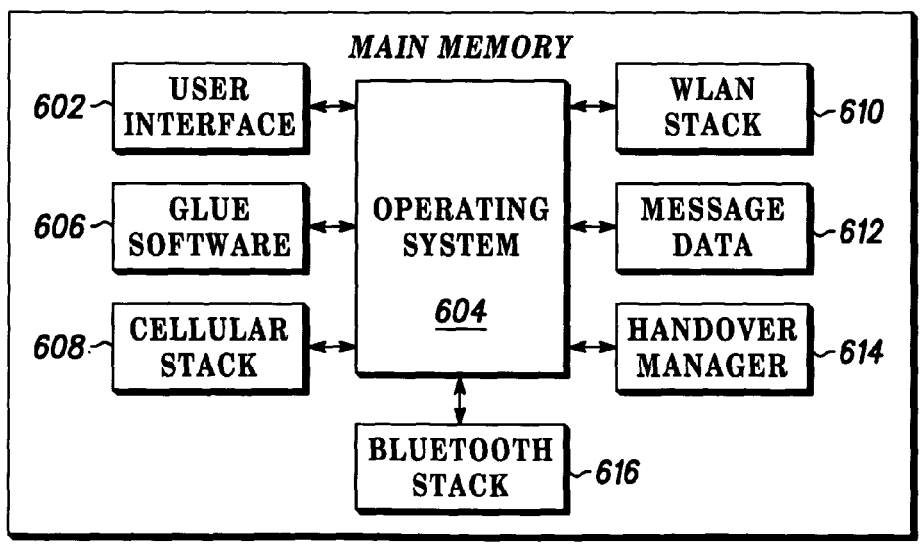
FIG. 6 is a block diagram illustrating the contents of an exemplary memory of a mobile communication device of the system of FIG. 3 according to a preferred embodiment of the present invention.

The mobile subscriber unit 306 also includes one or more processor/controllers 518, which processes instructions, performs calculations, and manages the flow of information through the SU 306. The SU 306 also includes a main memory 514 containing a program memory and a data memory, preferably random access memory (RAM), and may also include a secondary memory 515. Additionally, the processor 518 is communicatively coupled with the main memory 514. Included within the main memory 514, shown in more detail in FIG. 6, are a user interface 602, a handover manager 614 (to be discussed in more detail later), operating system platform 604, a cellular stack 608, a WLAN stack 610, a Bluetooth stack 616, and glue software 606. The operating system platform 604 manages resources, such as the message data 612 stored in data memory, the scheduling of tasks, and processes the operation of the cellular stack 608, the WLAN stack 610, the Bluetooth stack 616, and the handover manager 614 in the program memory 514.

The operating system platform 604 also manages a graphical and/or character-based display interface 521 that, according to the present example, is communicatively coupled to a display screen 522. Information is displayed to a user of the SU 306 via the screen 522, for visual output of information, and a speaker 526, for audible output. A user input interface 602 is communicatively coupled to the keypad 524 and the microphone 528 for receiving user input from a user of the SU 306. Additionally, the operating system platform 604 also manages many other basic tasks of the subscriber unit 306 in a manner well known to those of ordinary skill in the art.

Glue software 606 (FIG. 6) may include drivers, stacks, and low-level application programming interfaces (API's) and provides basic functional components for use by the operating system platform 604 and by compatible applications that run on the operating system platform 604 for managing communications with resources and processes in the subscriber unit 306.

The exemplary mobile subscriber unit 306 also contains a power source 520 for powering the wireless device 306, such as a battery, DC adapter, or AC adapter. Please note that the power source 520 provides power to the entire mobile subscriber unit 306, however, for purposes of clarity, it is only shown connected to the processor/controller 518 in FIG. 5. This description should be obvious to those skilled in the art.

The mobile subscriber unit 306 may also contain an infrared transmitter 536 and/or an electronic security trigger device 538 as used in typical electronic security or anti-theft systems (e.g. an RF tag) communicatively coupled to the processor/controller 518.

In alternative embodiments, the secondary memory 515 may include other similar means for allowing computer programs or other instructions to be loaded into the SU 306. Such means may include, for example, a removable storage unit and an interface (not shown). Examples of such may include a program cartridge and cartridge interface (such as that found in video game devices), a removable memory chip (such as an EPROM, or PROM) and associated socket, and other removable storage units and interfaces that allow software and data to be transferred from the removable storage unit to the SU 306.

In this document, the terms "computer program medium," "computer-usable medium," "machine-readable medium" and "computer-readable medium" are used to generally refer to media such as main memory 514 and secondary memory 515, removable storage drive, a hard disk installed in hard disk drive, and signals. These computer program products are means for providing software to the mobile subscriber unit 306. The computer-readable medium allows the SU 306 to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Various software embodiments are described in terms of this exemplary system. After reading this description, it will become apparent to a person of ordinary skill in the relevant art(s) how to implement the invention using other computer systems and/or computer architectures.

Figure 7:
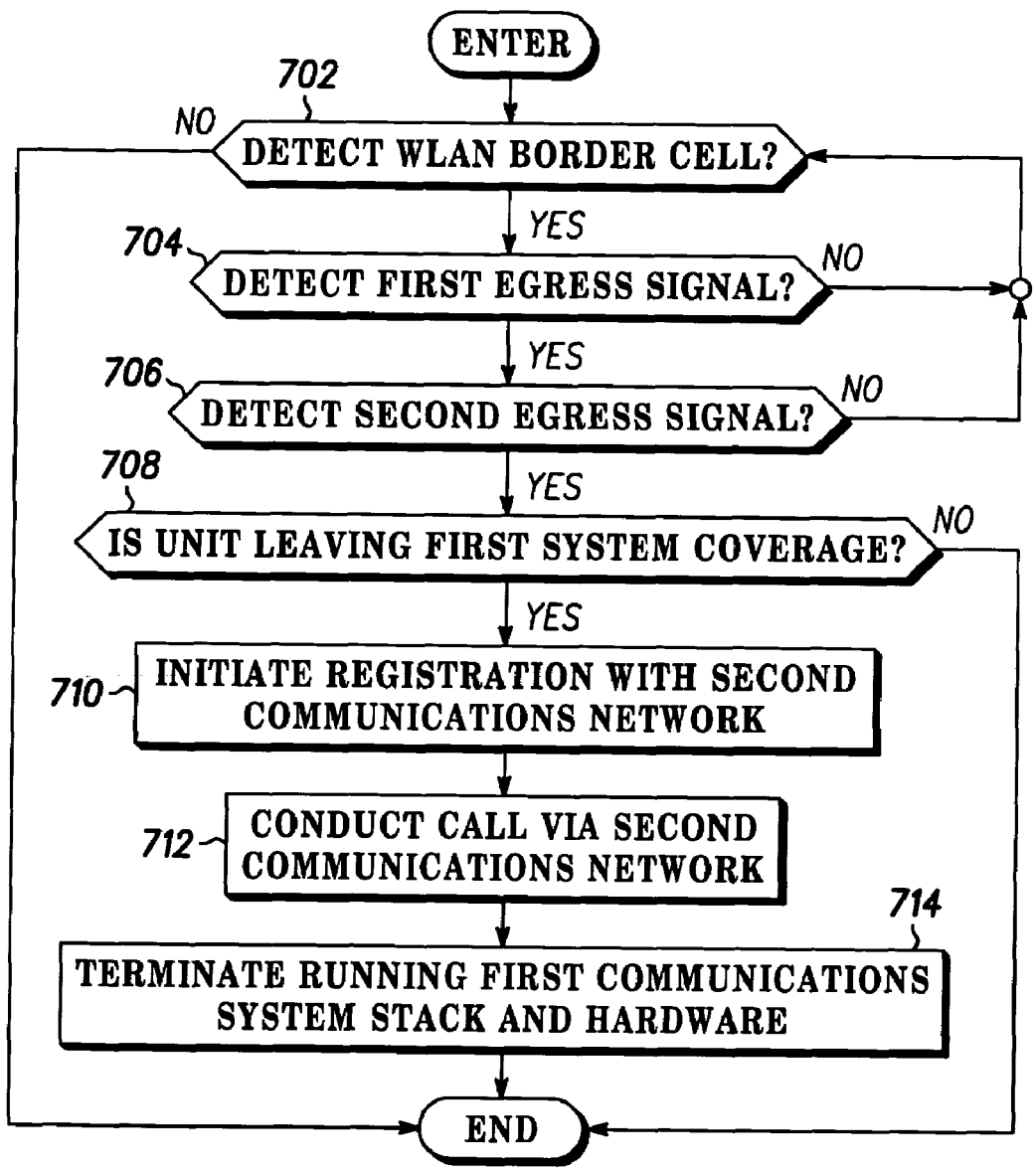
FIG. 7 is an operational flow diagram illustrating portions of a handover process between a WLAN and a WAN according to a preferred embodiment of the present invention.

FIG. 7 is an operational flow diagram of the exemplary system of FIG. 3, outlining the steps used for moving from an area of WLAN coverage to that of WAN coverage, or vice versa. A preferred method begins, at step 702, with the handover manager 614 attempting to detect a triggering event to initiate the process. The triggering event may include detecting the presence of a WLAN border cell 210 (this process is discussed in more detail later), detecting a degradation in signal quality of the WLAN coverage, or detecting the start of a call. In the particular example shown at step 702, the triggering event is detecting a WLAN border cell 210. It is important to note at this time that the unit 306 will execute this routine periodically when a call is not in progress, but will increase the frequency of running this routine during a call. At step 704, the unit has detected the border cell 210 or WLAN signal degradation and begins to search for a signal from the egress portal 302, which may preferably comprise a Bluetooth access point. If the handover manager 614 detects a first signal from the egress portal 302, the wireless device 306 will then begin searching for a second signal from the egress portal 302, at step 706. Each signal may have a unique identifier which would allow the wireless device 306, at step 708, to determine the direction in which it is moving by determining which signal it received first. If the unit 306 is leaving the coverage area of the first (current) system, then the handover manager 614 begins the registration sequence with a second system (if not already registered), at step 710. Otherwise, the unit 306 exits the process. Once the mobile unit 306 has registered with the new (second) system, the present and subsequent calls are conducted via the second communications system, at step 712. The unit 306 may then terminate running the stack and hardware of the first system, at step 714, thereby saving battery life.

Optionally, the handover manager 614 may begin process without the use of WLAN border cells 210. In this instance, the process is triggered by the detection of a first signal from an egress portal 302 or the start of a call. This embodiment allows for a smooth transition between communication systems without the necessity of designating at least one cell in the WLAN coverage area as a border cell 210.

A valuable enhancement to the preferred embodiment allows the access points within the WLAN coverage area to provide detailed, specific information about the availability of locally available WAN services via the WLAN. This enables the mobile device 306 to be much smarter both in what it looks for, as well as where and when. This feature provides assistance data by an access point over the WLAN interface concerning system selection information and optionally, dynamic information about the channel conditions on the WAN system of interest.

Figure 8:
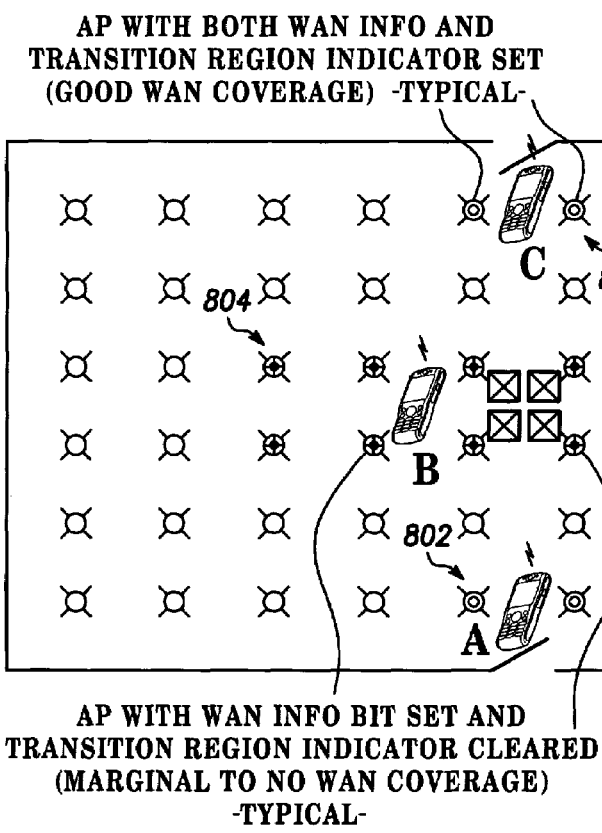
FIG. 8 is a more detailed block diagram of the system of FIG. 3 illustrating an optional enhancement to the system using two indications transmitted by a WLAN Access Point, according to an alternative embodiment of the present invention.

Within an enterprise or even a home, there may be a significant number of WLAN border access points but only a small number of these that actually serve as transition points (border cells) to or from the WAN. For example, as shown in FIG. 8, in a window office 806, the mobile unit 306 could likely operate on either the WLAN or WAN equally well but has no need to be prepared to do a handoff to a WAN. In this case it simply comes down to which is the preferred system. The unit 306 remains on the WLAN system, ignoring the other. However, an access point located in a lobby (or border cell 802) is quite different since handovers are highly likely. This embodiment incorporates broadcasting two indicators to assist in mitigating these problems. The first indicator is simply a WAN info availability indicator. When set, the mobile unit 306 knows that it can query the access point or decode the beacon information and get available WAN information. The second indicator identifies the access point coverage region as a transition region (border cell 802) to the WAN. The border cell indicator may also provide information about the border cell itself, such as whether the coverage border cell is an inner border cell or an outer border cell.

Figure 9:
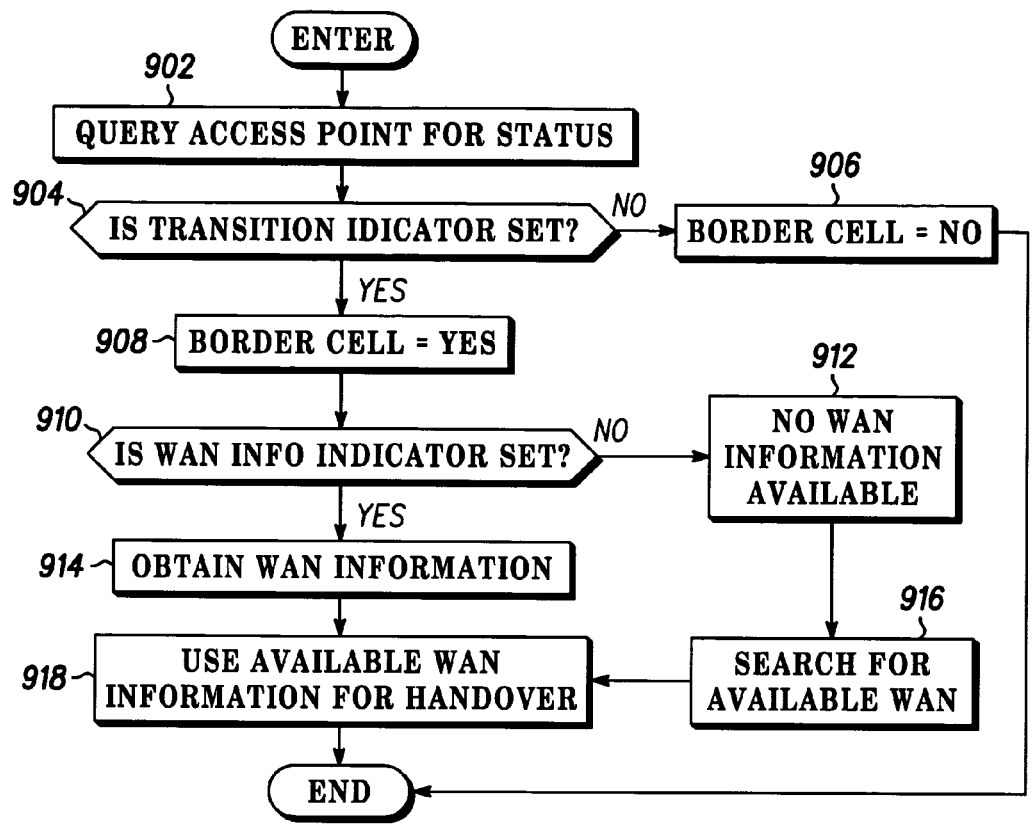
FIG. 9 is an operational flow diagram illustrating portions of a handover process between a WLAN and a WAN system using two additional broadcast indicators at the WLAN Access Point, according to a preferred embodiment of the present invention.

FIG. 9 illustrates a preferred method for determining if a wireless unit is within a border cell (step 702). The handover manager 614 of the wireless device 306 initiates the process, at step 902, by querying an access point of the WLAN for its status. The status data will include a border cell indicator and a WAN information indicator. If the border cell indicator is not set, at step 904, then the handover manager 614 determines that the wireless device 306 is not in a border cell 210, at step 906, and exits the process. If the border cell indicator is set, then the handover manager 614 determines that the wireless device 306 is within the coverage area of a border cell 210, at step 908. The wireless device 306 then determines if the WAN information indicator is set, at step 910. If the WAN information indicator is not set, at step 912, then the wireless device 306 determines that there is no information available for the WAN system in this area and must rely on scanning, at step 916, to determine the correct settings for the WAN coverage. However, if the WAN information indicator is set, then the wireless device 306 may query the access point or decode the beacon frame to obtain the WAN information available, at step 914. The available WAN information obtained from either the WLAN or from scanning will be used, at step 918, to determine the correct WAN with whom to conduct a handover. This will enable a quicker and more efficient transition to the WAN network.

The above process will also enable a mobile device 306 to have a selection of preferential networks. As an example, refer back to FIG. 8. In the office 806, the WAN info availability indicator would be set but the transition region indicator would be cleared. A mobile unit 306 in this environment could utilize the information if desired or ignore it. For example, a visitor comes into the enterprise where a service provider that is not his number one choice operates the internal WLAN. However, while in the core of the building 804, his WAN coverage is unavailable, requiring him to roam onto the WLAN. He now has coverage but it is not his preferred system. Rather than performing periodic background scans for his preferred WAN, he relies on the info provided by the access points as he moves through the building. As he enters the window office 806 for a meeting, his wireless device 306, having received a broadcast with the WAN info availability indicator set, queries the access point for the system information and upon finding his preferred system is again available, switches back to the WAN. In the lobby 802, both indicators would be set. Under these circumstances, even units 306 that have the WLAN as their most preferred system now move to the next level of alertness, doing what it takes to ensure a handoff is possible if the user does indeed move outside into the WAN system.

The WAN system selection information would include data such as the service providers, Radio Access Technologies (RAT's) and channel information so that the mobile unit 306 can go directly to the most preferred provider that offers the most preferred RAT, significantly shortening the search time. Another optional component would include dynamic information such as timing information so that associating WAN timing to known WLAN timing can reduce timing uncertainty. This might take the form of indicating at what time, in the WLAN domain, the next Fast Associated Control Channel (FACCH) burst will occur on the GSM system. Other dynamic information could include Pilot strength measurements. An access point would make this information available on the WLAN via broadcast or as requested.

To enable a smooth transition between a WLAN and a WAN system, other active and passive solutions are proposed. An active solution is defined as one where the mobile device 306 initiates the handover and a passive solution is one where the infrastructure advises the mobile to start system scanning for the second system and/or handover.

Figure 10:
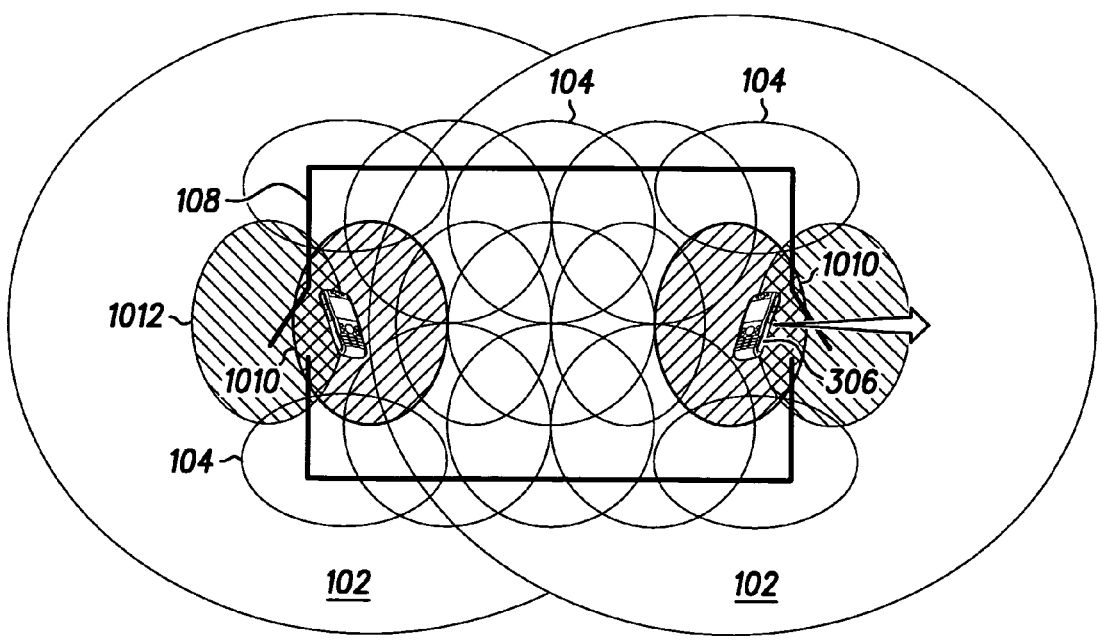
FIG. 10 is a block diagram illustrating a wireless communications system incorporating overlapping WAN cells, WLAN cells, and consecutive border WLAN cells inside and outside building entry points, according to an alternative embodiment of the present invention.

A first active alternative embodiment is illustrated in FIG. 10. In this case, two logical, consecutive (and uniquely identified) types of WLAN border cells (APs) are employed. One type is located indoors in the vicinity of the facility entry/exit points (inner border cell 1010), the other one is located towards the outdoors in the vicinity of the facility entry/exit points (outer border cell 1012). The border cell indicator may be used to determine the type of each border cell.

Figure 11:
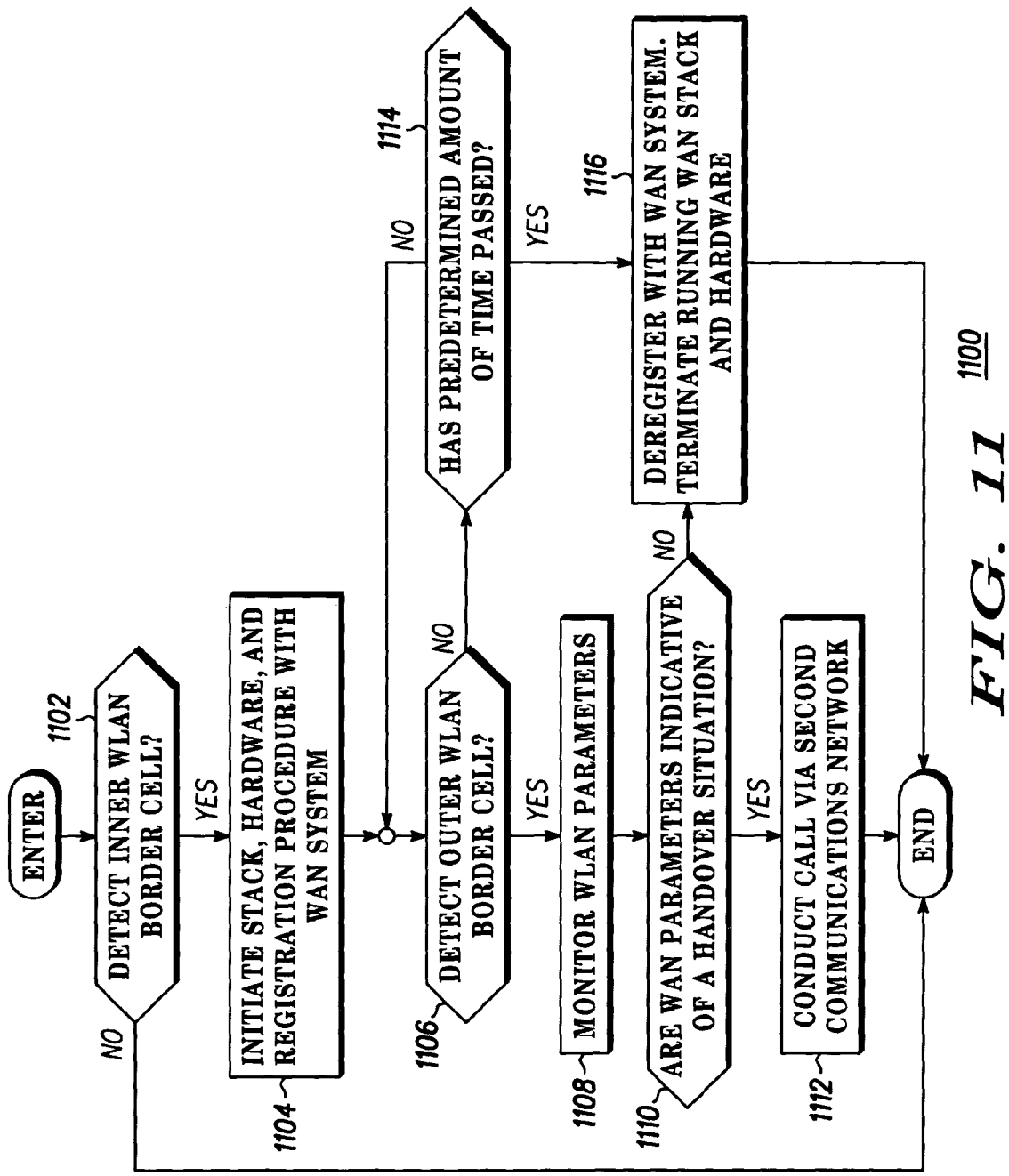
FIG. 11 is an operational flow diagram illustrating portions of a handover process between a WLAN and a WAN according to an alternative embodiment of the present invention.

The logic to support this alternative improved handover process for moving from WLAN to WAN coverage shown in FIG. 10 is illustrated in the operational flow diagram of FIG. 11. When the SU 306 detects a first border cell that is an inner border cell 1010, at step 1102, it brings up the WAN stack begins registration with the WAN system, at step 1104. At this time, the call handover and call initiation behaviors of the SU 306 are not modified. If the SU 306 detects a second border cell that is an outer border cell 1012, at step 1106, it starts to measure parameters of the WLAN, at step 1108, in order to determine a handover decision situation, at step 1110. For example, if the WLAN signal strength decreases rapidly or very much, the SU 306 may be leaving WLAN coverage and will handover any ongoing calls to the WAN and initiate later calls via the WAN. However, if the WLAN signal strength remains good, the SU 306 may conclude that it is stationary in the cell (maybe the user is on a break) and does not handover. If the SU 306 does not detect the outer border cell 1012, at step 1106, and a predetermined amount of time has passed, at step 1114, then the SU 306 deregisters with the WAN system and brings the WAN stack and hardware down, at step 1116. Note that it is possible that the SU 306 may detect other inner border cells during this time, but the handover process will not continue unless the presence of an outer border cell is detected. Also, the inner and outer cell may be discovered in the reverse order, which will make the SU 306 conduct one of a present and a subsequent call via the WLAN.

According to exemplary embodiments, the SU 306 can detect a WLAN border cell by detecting a beacon frame and/or probe response of the WLAN cell, or by being registered with it. Since one may often want to use rather small border cells, the first implementation, i.e., detecting the beacon frame of the border cell without the need to register with it, is the preferred one.

Further improvements can be realized for certain building configurations by using an inner border cell 1010 with a very short range (e.g. 1 second transition time) and instructing the SU 306 never to switch to an inner border cell (register with it). Instead, it will immediately begin the handover process According to an exemplary embodiment, the SU 306 can measure the inner 1010 and outer 1012 border cell WLAN carrier to interference ratio (C/I) when not in a call, thereby making an intelligent decision as to whether or not the user is stationary in an inner border 1010 to prevent registering the SU 306 on the WAN for stationary users working in the coverage area of the inner border WLAN cell 1010.

According to an exemplary embodiment, the SU 306 measure the inner 1010 and outer 1012 border cell WLAN C/I when in a call, thereby making an intelligent decision with respect to when the handover process should be started. This can be enhanced if the handover manager 614 captures the handover success ratios and timings for each egress/ingress point, and applies an intelligent algorithm to optimally trigger the handover based on the historical behavior of the subscribers passing through a specific entry/exit point.

According to an exemplary embodiment, an active portal solution employs diffused infrared devices (not shown) located in the doorway 212 and an infrared sensor 536 on the mobile device 306. When the mobile device 306 has passed through two consecutive infrared signals, the handover manager 614 begins the handover process.

According to an exemplary embodiment, a passive solution uses an electronic article surveillance point, such as that found at entry/exit ways of retail stores to detect theft or such as that found at entry/exit ways of companies to read the badges of the passing employees. The electronic article surveillance point lets the receiver plate communicate the identity of the mobile device 306 with the infrastructure. Then the infrastructure would advise the mobile unit 306 to start to scan for the second system and/or start handoff procedures. Note that this will require a different interference signature in each mobile device 306.

According to an exemplary embodiment, a passive solution uses a motion detection device that may or may not be coupled with the operation of a door 212 to send a message to the infrastructure. The infrastructure would then instruct an access point covering that door 212 to broadcast a packet to all wireless devices 306 in its coverage to start handoff procedures. Wireless devices 306 that receive this message would ignore the message if they were not in call.

Alternatively, the motion detector or a turnstile could detect a person walking towards the door in the direction from wireless system 1 to system 2. The motion detector or the turnstile could be functionally coupled to the portal and signals the portal to emit the first signal. The determining step in the wireless device 306 is then simply the presence of the first signal. The motion detector could also determine the direction and the first signal could include information on the direction. The information could then be used in the determining step.

According to an exemplary embodiment, a passive solution ties in badge-in/badge-out systems with the infrastructure such that when a badge is used, a message is sent to the infrastructure. The infrastructure then would send a message to the mobile device 306 when the badge is identified, asking it to trigger the registration and or handoff procedures. If the mobile device 306 is not identifiable thru the badge system, then similar to the previously discussed solution, the infrastructure would send a message to the access point servicing that door 212 and the access point could then broadcast a message to all mobile devices 306 in its coverage and the wireless devices 306 that are on a call would start the handoff procedures.

The present invention can be realized in hardware, software, or a combination of hardware and software. An embodiment of the present invention can also be embedded in a computer program product, which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Computer programs (also called computer control logic) are stored in main memory 414 and/or secondary memory 515. Computer programs may also be received "over-the-air" via one or more wireless receivers. Such computer programs, when executed, enable the subscriber unit 106 to perform the features of the present invention as discussed herein. In particular, the computer programs, when executed, enable the processor 418 to perform the features of the subscriber unit 106. Accordingly, such computer programs represent controllers of the subscriber unit 106.

The novel system and related methods for improving WLAN handover behavior provide significant advantages for dual-mode cellular communication systems (WLAN/WAN systems), such as improving the reliability of the handover, thereby allowing for significant cost savings by allowing more calls to be made over the WLAN. The WAN system will no longer be burdened with the unnecessary load of placing calls for users that remain within the WLAN coverage even though they are using the border cells. Users who work or are inside WLAN border cells for significant periods of time will especially benefit from the novel system and methods of the present invention. The actual wireless device will benefit from improved battery life for these users as it decreases the time required for the units to run the hardware and software for both systems simultaneously.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed:

1. A method comprising:
   detecting a first signal from an egress portal, the first signal associated with indicating passage through the egress portal, wherein the egress portal resides within a cell of a wireless local area network and occupies a region that is smaller than the cell;
   initiating, in response to detecting the first signal from the egress portal, a registration sequence with a second wireless communication system; and
   conducting a present or a subsequent call via the second wireless communication system.

2. The method of claim 1, further comprising:
   detecting a second signal from the egress portal; and
   determining, based upon an order of receiving the first signal and the second signal, that a wireless device is moving from the coverage area of the wireless local area network to a coverage area of the second wireless communication system, wherein the step of initiating is performed in response to determining that the wireless device is moving from the coverage area of the wireless local area network to the coverage area of the second wireless communication system.

3. The method according to claim 2, wherein the first signal comprises a wireless local area network signal substantially transmitted to an interior side of the egress portal and wherein the second signal comprises a wireless local area network signal substantially transmitted to an exterior side of the egress portal, the second signal being different from the first signal.

4. The method of claim 1, wherein the second wireless communication system is a wide area network (WAN).

5. The method of claim 4, wherein the wide area network (WAN) uses code division multiple access (CDMA), wideband code division multiple access (WCDMA), time division multiple access (TDMA), global system for mobile communications (GSM) or integrated digital enhanced network (iDEN).

6. The method of claim 1, wherein the wireless local area network (WLAN) uses at least one protocol of IEEE Standard 802.11 and Bluetooth.

7. The method of claim 1, wherein the egress portal comprises a Bluetooth access point, an infrared transmitter, or an electronic security detection device.

8. The method of claim 1, wherein the detecting a first signal step is performed in response to detecting a triggering event.

9. The method of claim 8, wherein the triggering event comprises detecting a wireless local area network border cell, detecting a degradation in signal quality, or detecting a start of a call.

10. The method according to claim 1, wherein the first signal is only for indicating passage through the egress portal.

11. The method according to claim 1, further comprising conducting a present or prior call via the wireless local area network.

12. A method comprising:
    determining that a wireless device, operating in a first communication system is detecting a wireless local area network inner border cell of the first communication system, wherein the inner border cell broadcasts an inner border cell indicator;
    initiating a registration sequence with a second wireless communication system in response to determining that the wireless device is detecting the wireless local area network inner border cell;
    detecting a second wireless local area network outer border cell, wherein the outer border cell broadcasts an outer border cell indicator;
    determining that the wireless device is moving from a coverage area of the first communications system to a coverage area of the second communications system in response to detecting the second wireless local area network outer border cell; and
    conducting a present or a subsequent call via the second wireless communication system.

13. The method according to claim 12, wherein detecting the second wireless local area network border cell is done within a predetermined amount of time.

14. The method according to claim 12, wherein conducting the present or the subsequent call via the second wireless communication system is performed in response to determining that the wireless device is moving from the coverage area of the first communications system to the coverage area of the second communications system.

15. The method according to claim 12, wherein the inner border cell is substantially present within the interior of a structure and the outer border cell is substantially present outside the structure.

16. A method comprising:
    detecting a triggering event;
    detecting a signal from an egress portal in response to detecting a triggering event, the signal associated with indicating passage through the egress portal, wherein the egress portal resides within a cell of a wireless local area network and occupies a region that is smaller than the cell;
    obtaining available wide area network information from a wireless local area network access point; and
    scanning, in response to the detecting, for at least one wide area network listed in the available wide area network information.

17. The method of claim 16, wherein the triggering event comprises detecting a wireless local area network border cell, detecting a degradation in signal quality, or detecting a start of a call.

18. A mobile communication device comprising:
    at least two transceivers, each transceiver designed to operate on a separate wireless communications system, for transmitting and receiving wireless information;
    a controller, communicatively coupled to each transceiver, for managing the operation of the mobile communication device;
    a first wireless communications system stack, communicatively coupled to the controller, having instructions for communicating according to its respective protocol;
    a second wireless communications system stack, communicatively coupled to the controller, having instructions for communicating according to its respective protocol;
    a means for receiving signals from an egress portal, the signals associated with indicating passage through the egress portal; and
    a handover manager, communicatively coupled to the controller, the first wireless communications system stack, the second wireless communications system stack, and the means for receiving signals from an egress portal, the handover manager for determining, in response to determining that the means for receiving signals from an egress portal has received at least one signal from the egress portal indicating passage therethrough, when to handover from a first wireless communication system to a second wireless communication system, wherein the egress portal resides within a cell of a wireless local area network and occupies a region that is smaller than the cell.

19. The mobile communication device of claim 18, wherein the at least two transceivers share common hardware and software.

20. The mobile communication device of claim 18, wherein the means for receiving signals from an egress portal comprises a Bluetooth transceiver, an infrared sensor, or an electronic security detection device.

21. A mobile communication system comprising:
    a structure having at least one entry/exit point;
    at least one egress portal located at the at least one entry/exit point, the egress portal for transmitting signals to a mobile communications device, wherein the signals are associated with indicating passage through the at least one egress portal;
    at least one cell of a wireless local area network communications system, the cell providing communication coverage within the structure, wherein the egress portal resides within the cell of the wireless local area network communications system and occupies a region that is smaller than the cell; and
    at least one coverage cell of a second communications system, overlapping the at least one cell of the wireless local area network, for providing communication coverage outside the structure;
    wherein at least one mobile subscriber device can be communicatively coupled with the at least one cell of the wireless local area network communications system and the at least one cell of the second communications system, the device for determining, in response to determining that the device has received the signals from the at least one egress portal indicating passage therethrough, when to handover from one wireless communication system to the second wireless communication system.

22. A mobile communication system of claim 21 further comprising:
at least one border cell of the wireless local area network communications system, the border cell located at the entry/exit point of the structure, providing a transition region between the wireless local area network communications system and the second communications system.

23. A memory comprising computer instructions for performing the steps of:
detecting a first signal from an egress portal, the first signal associated with indicating passage through the egress portal, wherein the egress portal resides within a cell of a wireless local area network and occupies a region that is smaller than the cell;
initiating, in response to detecting the first signal from the egress portal, a registration sequence with a second wireless communication system; and
conducting a present or a subsequent call via the second wireless communication system.

24. The memory of claim 23, further comprising computer instructions for:
detecting a second signal from the egress portal; and
determining, based upon an order of receiving the first signal and the second signal, that a wireless device is moving from the coverage area of the wireless local area network to a coverage area of the second wireless communication system, wherein the step of initiating is performed in response to determining that the wireless device is moving from the coverage area of the wireless local area network to the coverage area of the second communication system.

25. The memory of claim 23, wherein the egress portal comprises a Bluetooth access point, an infrared transmitter or an electronic security detection device.

26. The memory of claim 23, wherein the step of detecting a first signal is performed in response to detecting a triggering event.

27. The memory of claim 26, wherein the triggering event comprises detecting a wireless local area network border cell, detecting a degradation in signal quality, or detecting a start of a call.

28. A memory comprising computer instructions for performing the steps of:
determining that a wireless device, operating in a first communication system is detecting a wireless local area network inner border cell of the first communication system, wherein the inner border cell broadcasts an inner border cell indicator;
initiating a registration sequence with a second wireless communication system in response to determining that the wireless device is detecting a wireless local area network inner border cell;
detecting a second wireless local area network outer border cell, wherein the outer border cell broadcasts an outer border cell indicator;
determining that the wireless device is moving from a coverage area of the first communications system to a coverage area of the second communications system in response to detecting the second wireless local area network outer border cell; and
conducting a present or a subsequent call via the second wireless communication system.

29. The method according to claim 28, wherein detecting the second wireless local area network border cell is done within a predetermined amount of time.

30. The method according to claim 28, wherein conducting the present or the subsequent call via the second wireless communication system is performed in response to determining that the wireless device is moving from the coverage area of the first communications system to the coverage area of the second communications system.

31. At an egress portal, a method to improve handover behavior of a mobile device between a wireless local area network (WLAN) containing a plurality of WLAN access points and a wireless wide area network (WAN) containing a plurality of WAN cells, the egress portal being located at an entry/exit point of the WLAN and not including a WLAN access point or a cell for a WAN, the method comprising:
conducting a call via a first network, the first network being either the WLAN or the WAN;
detecting by the egress portal a movement of the mobile device from a coverage area of the first network to a coverage area of a second network, the second network being the other one of the WLAN or the WAN;
in response to detecting the movement of the mobile device, advising the mobile device to switch to the second network; and
conducting, in response to advising the mobile device to switch to the second network, the call via the second network.

* * * * *